Dec. 15, 1959  J. M. BARNOTHY  2,917,634
NUCLEAR RADIATION COUNTERS
Filed Aug. 22, 1955  3 Sheets-Sheet 1
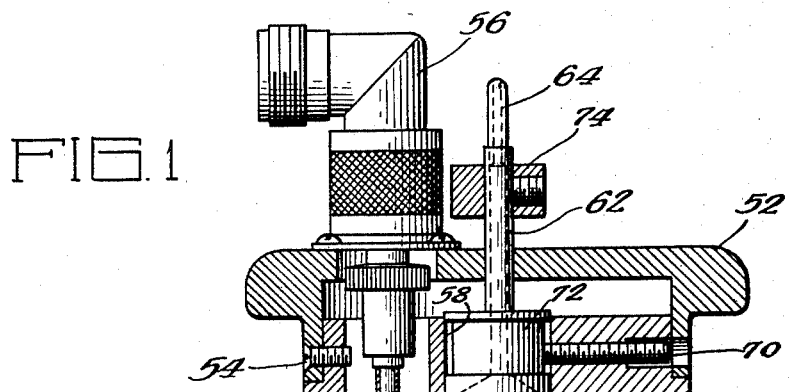
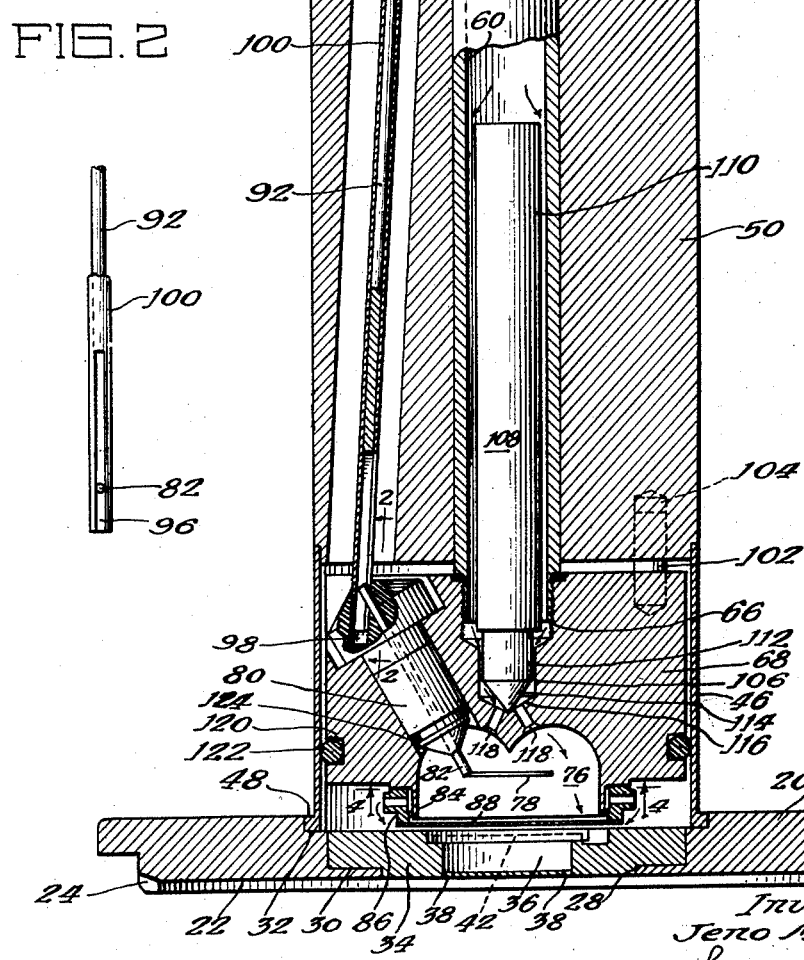
Inventor:
Jeno M. Barnothy
By Leonard Mierman
Attorney Dec. 15, 1959 J. M. BARNOTHY 2,917,634
NUCLEAR RADIATION COUNTERS
Filed Aug. 22, 1955 3 Sheets-Sheet 2
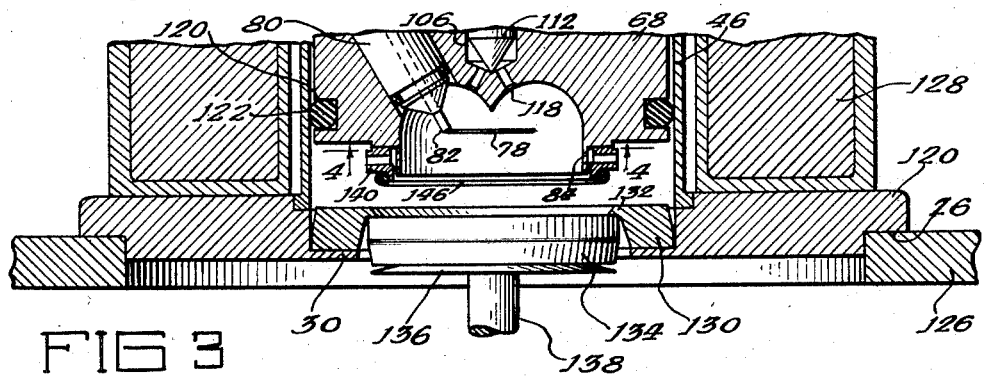
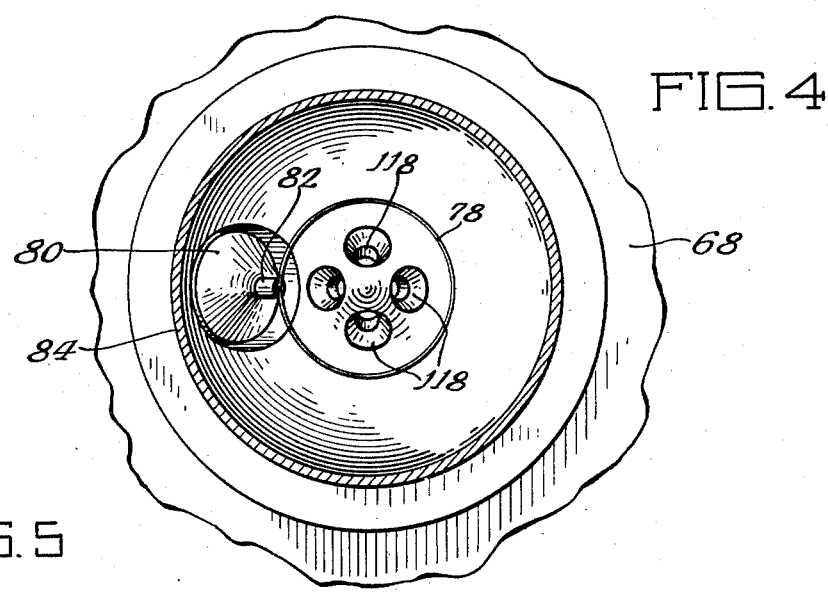
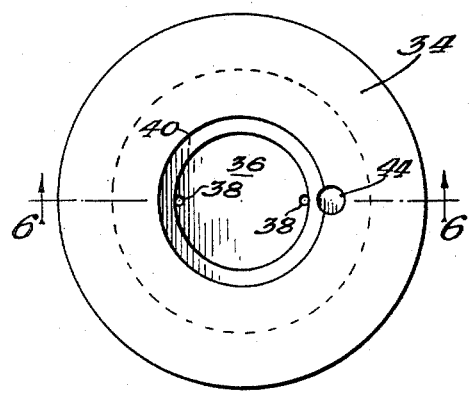
Inventor:
Jeno M. Barnothy
By: Leonard Nierman
Attorney

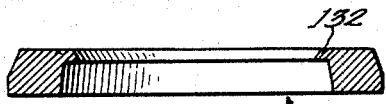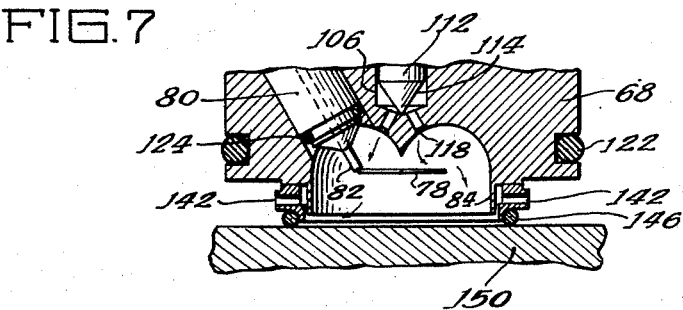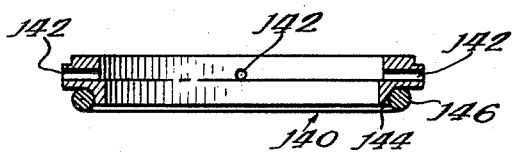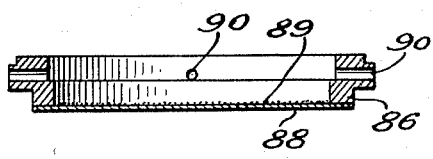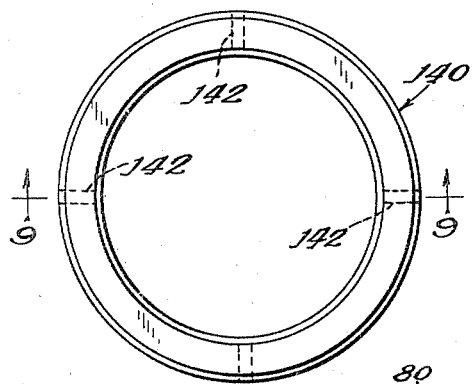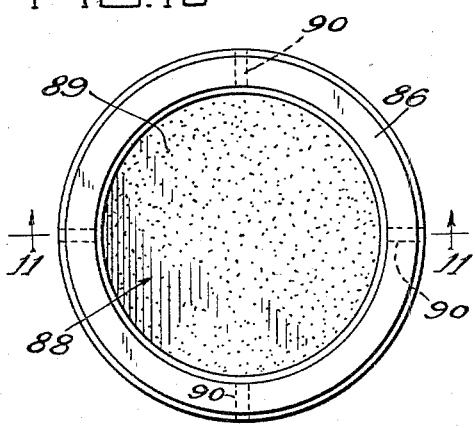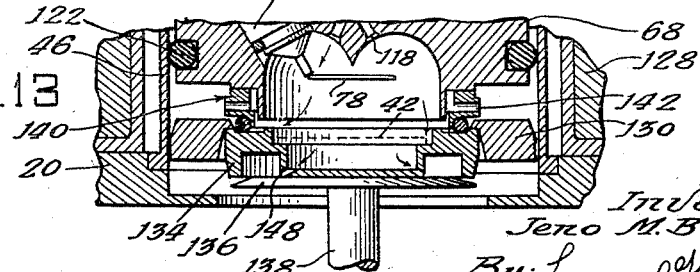

United States Patent Office 2,917,634
Patented Dec. 15, 1959

2,917,634

NUCLEAR RADIATION COUNTERS

Jeno M. Barnothy, Evanston, Ill., assignor to Nuclear-Chicago Corporation, a corporation of Delaware Application August 22, 1955, Serial No. 529,856

12 Claims. (Cl. 250—106)

This invention relates to nuclear radiation counters, and more specifically to atmospheric pressure counters adapted for the detection and measurement of relatively weak radiations, such as low energy beta particles.

It is the principal object of the present invention to provide a nuclear radiation counter which is highly versatile and at the same time both sensitive and accurate in all of the various types of counting operations for which it may be employed.

Nuclear radiation counters may be, and are, called upon to perform a large variety of radiation measurement tasks. The simplest type of counting operation, in general, is the counting of gamma rays, which are highly penetrating and thus may readily be counted with any type of sealed Geiger Muller counter, the penetration of the containing envelope by the particles to be counted in this case constituting essentially no problem. More exacting requirements are imposed, however, where less penetrating radiations (alpha particles and beta rays) are to be counted. For this purpose there were devised some years ago proportional counters for alpha and beta particles in which the sample to be counted was introduced to the counter volume by means of a more or less elaborate gas lock mechanism, the counter gas being constantly flushed through the counter at slightly greater than atmospheric pressure, and vented to the atmosphere. More recently, there were found pre-mixed self-quenching gases (described in U.S. Patent No. 2,519,864, issued to Paul B. Weisz on August 22, 1950) suitable for atmospheric pressure counting in the Geiger (as opposed to proportional) region of ion multiplication. Since the auxiliary equipment required for counting in the Geiger region is considerably simplified by the elimination of the pulse-height selectors, etc., required in the proportional region, flow-type Geiger counters came into common use for the counting of alpha and low energy beta particles, in counting operations where only one type of radiation was present.

Where more than one type of radiation is present, however, it was and is required that operation in the proportional region be employed, in order that discrimination may be made between the various types of radiation present by auxiliary electronic equipment.

Various counters were designed which eliminated the relatively complex and expensive gas-lock mechanisms employed for introduction of the samples into the early flow-type counters. However, up till relatively recently, it was found that the counter designs in which the gas lock was eliminated would require an excessive flushing time after introduction of the sample, with its accompanying large quantity of air, prior to the counting operation. It was found by William C. Davidon (co-pending application Serial No. 330,055, filed January 7, 1953, and the continuation thereof, Serial No. 595,353, filed July 2, 1956) that this required flushing time could be greatly reduced by improved design of the gas inlet portion of the counter, the dispersal of the inlet gas-flow into the counter volume by the provision of a plurality of symmetrically distributed inlet apertures substantially reducing the local jets, eddies, and "dead spots" of gas produced by the single jets or orifices theretofore employed.

Direct insertion of samples into the counter volume, in the case of certain types of samples, introduces spurious counts and discharges of the counter, unless extreme care is taken to prepare the samples under examination in such a manner as to eliminate these phenomena. The difficulties found in direct insertion of the sample into the counter volume (commonly called "windowless" counting) are found to arise from a number of sources. One source of difficulty is the accumulation of the electrostatic charge on the sample, the extent and seriousness of which will depend on the conductivity of the sample, its moisture content, its radioactivity, and similar variables. Likewise, difficulty is encountered where the samples are liquid or moist or otherwise volatile; although the effect of moisture in the counter may be more or less compensated by adjustment of the counter voltage, this expedient is prohibitive where samples varying in the amount of emitted vapor are intermixed and successively counted. Further, if the samples are, as is sometimes encountered, in the form of powder or dust, the walls of the counter may readily become contaminated with radioactivity.

Where these difficulties are not encountered, windowless operation is highly desirable. However, where some or all of the samples to be counted are not electrically conducting, or emit vapors or dust, and it is unduly laborious to convert the samples to a chemical or physical form by which these difficulties may be eliminated, it is desirable to place the sample outside of the counter volume and employ a conducting window to permit ingress of the particles being counted to the counter volume.

The present invention provides a novel radiation counter electrode structure which maximizes the efficiency of counting by greatly eliminating the portions of the counter volume of low potential gradient which heretofore existed in counters designed for generally similar purposes. Likewise, in the teaching of the present invention, there is provided a novel type of gas flow system whereby the absorption of particles and particle energy by the air existing between the sample and the window (when the window is employed) is substantially eliminated.

The various features and advantages discussed above are combined in the embodiment of the invention hereinafter to be described to produce a counter which is suitable for the counting of hard and soft gamma, alpha, and beta particles, in the proportional or Geiger region, in window-type of windowless operation, not only from carefully prepared samples of optimum physical and chemical form, but also from samples which are volatile, powdered, non-conducting, or otherwise difficult to count, and even from such unprepared samples as large sheets of metal such as those employed in tracer work and similar applications of radioactivity techniques, and samples of frozen tissue.

The manner in which the objects and advantages of the invention are obtained will best be understood from a description of the embodiment of the invention illustrated in the appended drawing, from which there will also be apparent additional advantages achieved by various features of construction thereof.

In the drawing:

Figure 1 is a view in vertical section of a radiation counter assembly embodying the invention;

Figure 2 is a fragmentary detail view taken along the line 2—2 of Figure 1 in the direction indicated by arrows;

Figure 3 is a fragmentary sectional view illustrating the manner of use of the assembly of Figure 1 as a windowless counter employed with an automatic sample changer;

Figure 4 is an enlarged fragmentary sectional view taken along the line 4—4 of Figure 1;

Figure 5 is an enlarged plan view of a sample pan holder constituting a portion of the assembly of Figure 1;

Figure 6 is a sectional view taken along the line 6—6 of Figure 5;

Figure 7 is a fragmentary sectional view illustrating the manner of use of the device of Figure 1 as a windowless counter employed for measurement of the activity of large areas such as metal plates;

Figure 8 is a detail view of a weight illustrated in Figure 3;

Figure 9 is an enlarged sectional view of an O-ring holder or mount shown in Figures 3 and 7;

Figure 10 is a plan view of the holder or mount of Figure 9;

Figure 11 is an enlarged sectional view of a radiation-transparent window and the holder or mount therefor, constituting a portion of the device of Figure 1;

Figure 12 is a plan view of the window and holder or mount of Figure 11; and

Figure 13 is a fragmentary sectional view similar to Figure 3, but illustrating the parts in another position.

Referring first to Figure 1, it will be seen that the radiation counter assembly therein illustrated is supported upon a base plate 20 adapted to be rested on a table or similar support. A peripheral downwardly extending lip or flange 22 on the lower surface of the base plate 20 has oppositely disposed slots 24 therethrough to permit the exit of gas from the under side of the base plate when the base plate is placed on a table. The periphery of the base plate is formed with a downwardly facing shoulder or rabbet 26 for use when the device is employed with an automatic sample changer, as later to be described.

The base plate 20 has a large central aperture 28 which is surrounded by stepped upwardly facing shoulders or rabbets 30 and 32. Resting on the shoulder 30 is a sample-holder or support 34, shown in greater detail in Figures 5 and 6. The sample holder 34 has a central well 36, the floor of which is apertured at 38, the well 36 being provided with an upwardly facing shoulder 40 adapted to receive and support a sample pan or planchet 42, illustrated in dotted form in Figure 1. A partial bore 44 at the edge of the sample pan support shoulder 40 permits access for removal and replacement of sample planchets with tweezers or similar tools.

The remainder of the assembly is supported on the base plate 20 by a sleeve 46 having at the lower end thereof a flange 48 seated on the rabbet 32, and preferably coated with a suitable grease to make the joint reasonably gas-tight. The upper edge of the sleeve 46 supports a cylinder of radiation shielding material 50, such as iron, constituting the shield portion of the assembly. When the assembly is dropped into the bore of a tubular shield (not illustrated in Figure 1, but shown fragmentarily in Figures 3 and 13, later to be described), the iron shield 50 cooperates with the tubular shield in shielding the ionization region of the counter from external radiations. At the upper end of the shield portion 50 is a flanged cap 52, secured by screws 54. On the cap 52 is mounted a coaxial electrical connector 56. An axial bore 58 extending through the cylindrical shield 50 slidingly receives a central support tube 60. At the upper end of the support tube 60 is an extension 62 terminating in a nipple portion 64 adapted to receive suitable tubing for the flow of gas into the support tube 60.

The lower end of the support tube 60 is threaded at 66 into a cylindrical block forming the body 68 of the radiation counter. The counter body 68 is thus supported by the central support tube 60, the vertical position thereof being adjustable by sliding of the tube 60 within the shield 50, set screws 70 engaging a reduced portion 72 to lock the tube 60 and counter body 68 in any desired vertical position. If the set screws 70 are not withdrawn an excessive amount, the motion of the tube 60 and counter body 68 is limited by the extremities of the reduced portion 72, but a locking ring 74 is affixed to the extension portion 62 of the tube 60 to serve as a limit stop so that the assembly of the tube 60 and counter body 68 cannot accidentally fall from the shield 50, as could otherwise occur if the shield 50 were handled with the screws 70 excessively loosened.

The counter volume or cavity 76 is formed in the lower end of the body or block 68. The shape of the counter volume 76 may be described as a toroid generated by rotation of a plane figure comprising a semi-circle having appended thereto one-half of the circumscribed square, about a line intersecting the plane figure and perpendicular to the diameter of the semi-circle and displaced from the center thereof, thus producing a more or less trochoidal upper cross-section and a flat lower cross-section.

The center wire 78 of the counter is supported by an insulator 80 mounted in the block 68. A fine tube 82, such as the type of tubing employed in hypodermic needles, is driven through the insulator 80 and supports the center wire 78 (of .002 inch diameter, for example), which is formed into a circular loop, the ends being secured in the tube 82, as by crimping of the latter. The diameter of the loop and the placement thereof is such that the loop lies along the circle generated by the center of the above-described semi-circle (of a ⅜ inch radius in one embodiment) in the figure of revolution which is descriptive of the form of the cavity. The lower end of the cavity 76 lies within a ferrule 84 formed on the central portion of the lower end of the counter body or block 68. Encircling the ferrule 84 is a ring 86, a radiation-transparent conducting window 88 extending across the ring.

It will be seen upon study that the electrode configuration thus provided offers a number of important advantages over window-type and windowless counters heretofore employed. The electric field in the upper portion of the cavity is substantially uniform in all planes, as in an anchor-ring-shaped cavity, and an identical field is produced between the anode and a circle of points on the plane window. The formation of the toroid by rotation of the figure of generation about a line intersecting the semi-circle of generation (rather than about a line lying outside it, as in the case of an anchor ring) eliminates the "dead spot" otherwise existing in the center of the loop, and thus permits maximum efficiency with small-area samples. The central upper boss or cusp formed in the top of the cavity contributes not only to the electric field uniformity, but also provides a convenient and efficient location for the distributed gas-flow apertures 118, which are thus directed both at the center-wire or anode and at the periphery of the window, where the gas is vented.

The construction of the ring 86 and the window 88 are shown in greater detail in Figures 11 and 12. The ring 86 has a portion of large diameter and a portion of smaller diameter, the former having radial apertures 90. The window 88, bearing a conducting coating 89 is fastened by cement to the outer (smaller diameter) face of the ring.

The ring 86 is fitted over the tubular extension or ferrule 84. Both the smaller and larger inner diameters of the ring 86 are larger than the outer diameter of the tubular extension 84 on the counter body or block 68. A small coating of grease is deposited on the upper surface or face of the ring 86, this grease coating, together with highly polished finishing of both the upper surface of the ring and the portion of the counter body 68 which is contacted thereby, serving as cooperating disengageable fastening means to securely maintain the ring 86 on the counter body against both the action of gravity and much stronger pulling forces, twisting being required to break the seal thus formed. It will be noted that the ring 86 does not fit tightly on the ferrule 84, but on the contrary a substantial clearance is provided for the passage of gas. However, in installing the ring, no particular precaution is required in centering, because small variations in gas passage annulus size around the circumference of the ring will not measurably impair the results, since it is found that symmetry of the gas exit passage is far less important to proper operation than symmetry of the gas inlet passages.

Electrical connection is made from the coaxial connector 56 to the tube 82, and thus to the center wire 78, through a contact rod 92 of beryllium-copper or similar material, the upper end thereof being soldered at 94 to the central conductor of the connector 56, and the lower end thereof having formed therein a slot or fork 96. The lower end of the contact rod 92 is received in a well 98 bored at an appropriate angle in the insulator 80. The forked end portion 96 slidingly engages the upper end of the tubing 82, thus establishing electrical contact in all vertical positions of the counter body 68 with respect to the shield portion 50. The contact rod 92 is surrounded by an insulator sleeve 100 in order to prevent spurious counting due to ionization in the bore in the shield portion 50 through which the rod 92 extends. The counter body 68 is provided with a guide pin 102 cooperating with a matching guide socket 104 in the shield portion to prevent rotation of the counter body 68. Seated in a well 106, formed in the upper surface of the counter body 68, and in the lower portion of the tube 60, is a central rod 108 having a main body portion 110, which is of sufficiently smaller diameter than the inner diameter of the tube 60 to permit free gas passage therealong, and a lower extension 112 terminating in a conical point 114, the extension portion 112 being of sufficiently smaller diameter than the well 106 to likewise permit free gas passage. The well 106 is formed with a conical bottom 116. The bottom of the well is connected to the counter volume 76 by four symmetrically dispersed flared apertures 118. The angle of the conical point 114 is substantially smaller than the angle of the conical bottom 116, thus forming a small annular gas chamber or header at the point of feed to the apertures 118, which are flared sufficiently to produce gas velocity substantially below the critical velocity for turbulent flow.

The counter body 68 has a circumferential groove at 120 receiving an O-ring 122, thus forming a gas seal between the body 68 and the sleeve 46 to prevent the escape of gas from the region beneath the counter body through this path. The escape of gas from the counter itself along the insulator 80 is similarly prevented by an O-ring 124.

The assembly as illustrated in Figure 1 is designed for use in manual counting (i.e., counting without the use of an automatic sample changer), the base plate 20 being rested upon a table or similar surface. For this type of operation, the counter assembly is manually lifted from the base plate 20 each time that the sample (shown in dotted form at 42) is changed. The counter gas, selected for proper operation in the proportional region or in the Geiger region, depending upon the type of counting operation being performed, is connected by means of the nipple 64 to a gas source having a suitable flow regulation provision. The gas flows down through the small annular clearance (unsymmetrical, because the top of the rod 108 is not centered) between the rod 108 and the tube 60 and the well 106 into the small annular header feeding the apertures 118. The gas, sweeping through the counter volume, exits up between the ferrule 84 and the ring 86 to the small header formed by the enlarged inner diameter of the ring 86 at the top portion thereof, and exits from the counter body through the radial apertures 90 in the ring. Since the gas is confined by the O-ring 122 and the grease seal of the flange 48 to the base plate 20, the gas flows radially inwardly and under the edge of the sample 42 (which is generally extremely light in weight, thus permitting free leakage), into the cup or well 36 in the sample support 34, and out to the surrounding atmosphere through the apertures 38 in the sample support 34 and the slots 24 in the lip 22 on the under surface of the base plate. It will thus be seen that not only is the counter interior flushed by the flow of the gas, but in addition, the gas, in leaving the assembly, flushes air from the neighborhood of the counter window exterior, and thus from the region between the sample and the counter window. Since the gases employed (such as those described in the above-mentioned Weisz patent) are lighter-than-air gases, the absorption of energy which occurs in the gas-filled region between the sample and the window is greatly reduced, thus further contributing to the efficiency of the counter in counting beta particles of low energy.

The device is also well adapted for use with an automatic sample changer, such as that shown in U.S. Patent 2,843,753 of Raymond L. Meeder. This type of operation is illustrated in Figures 3 and 13 of the drawing of the present application. In the illustrations of these figures, no details of the sample changer itself are shown, since the sample changer constitutes no part of the present invention and suitable sample changers for use with the radiation counter of the invention are described in the co-pending application mentioned and elsewhere. It is also to be noted that the radiation-transparent conducting window shown in Figure 1, and described above in connection with manual sample-changing, is not shown in Figures 3 and 13, the type of operation illustrated in these figures being windowless operation wherein the sample is placed directly in the counter cavity, without the interposition of a window. It will of course be understood that the selection of windowless operation for illustration in connection with the automatic sample changer is merely arbitrary, and made for mere convenience in illustrating the various modes and combinations of modes of operation of the device, which is readily suited for either window or windowless operation either manually or with an automatic sample changer.

As shown in Figures 3 and 13, the base plate 20 is supported on the rabbet 26, heretofore described, on a suitable locating and support plate 126 constituting a portion of the automatic sample changer, and therefore only fragmentarily illustrated. The counter rests in, and is surrounded by, a suitable tubular shield 128 (fragmentarily illustrated). In the manner of use shown in Figures 3 and 13, the sample or planchet holder 34 employed in manual operation and previously described, is not employed. In place thereof there is substituted a ring weight 130, shown alone in Figure 8. The ring weight 130 is of an outer diameter to properly seat on the shoulder portion or rabbet 30 of the base plate. It has a large central aperture, which has an inwardly extending flange 132 in the upper portion thereof. The main body of the central aperture in the ring weight 130 is of sufficient diameter to freely pass a sample holder or planchet holder 134 of the type employed with the automatic sample changer. The flange 132, however, extends inward sufficiently to be engaged by the upper edge of the planchet holder 134 as the latter, which is supported on the table 136 of one of the moving sample supports of the changer, is lifted by the depending pin or shank 138 from a lower-most position (not illustrated) in which the planchet holder 134 is brought beneath the counter assembly by the counter mechanism. In Figure 3, the parts are in the position in which the upwardly moving planchet holder engages the ring weight 130, and in Figure 13, the parts are shown with the planchet holder fully elevated, so as to form a gas seal with a sealing ring 140 employed in place of the ring and window assembly 86 and 88 of Figure 1, for windowless operation.

The sealing ring 140, shown in detail in Figures 9 and 10, has portions of greater and smaller inner diameter corresponding exactly to the same portions of the ring 86, and apertures 142 corresponding to the apertures 90 previously described. However, the lower end of the sealing ring 140 is formed with a downwardly and outwardly facing groove 144, of arcuate cross section, retaining an O-ring 146, which accordingly protrudes beyond the lower end of the ring 140.

By the sliding adjustment earlier described, the height of the counter body 68 with respect to the base plate 20 is made so that at the uppermost position of the lifting portion of the sample changer mechanism, the O-ring 146 is slightly compressed by the upper annular surface of the planchet holder 134 to form a gas seal. This adjustment may readily be made for any particular automatic sample changer by first drawing the counter 68 to its uppermost position with the set screws 70 loosened, then permitting the counter body 68 to drop to the position wherein the seal is made by gravity, and thereupon tightening the set screws 70; this adjustment is of course performed with the sample changer quiescent, and once made for the particular sample changer, it need not be made again. It is to be noted that this adjustment, made with the use of the sealing ring 140, also serves for the proper positioning of the window 88 with respect to a sample when the sealing ring 140 is replaced by the window and its support ring, either for manual or automatic operation.

As seen in Figure 13, the planchet holder 134 is provided with apertures 146 in the bottom of the well thereof, such apertures being disposed downwardly and radially to permit escape of gas from the planchet holder. In the counting position shown in Figure 13, the counting gas flows directly through the counter body, leaking beneath the under surface of the sample planchet 42, as previously described, thus flushing both the interior of the counter and the volume of the planchet holder 134. The weight of the ring 130 serves to break the relatively light holder 134 away from the O-ring 146 when the table 136 is withdrawn downwardly after the counting operation.

It will be observed that the apertures 142 are not employed in the utilization of the device shown in Figure 13. These apertures in the sealing ring 140 are required only when the device is employed for the counting of very large area samples, as discussed later herein in connection with Figure 7. If such type of operation is not desired, the apertures 142 should be omitted. In any event, the apertures should be plugged if it is found that they interfere with the operation of the type shown in Figure 13 by permitting the admission of air from the exterior by entrainment in the downwardly flowing gas. In the optimum arrangement, two sealing rings 140 are provided as part of the assembly, one having apertures and the other being unapertured, for interchange in the different types of use described.

In Figure 7 there is illustrated the manner of use of the device with large area samples such as a metallic plate or other work piece 150, the radioactivity of which is under measurement. In such use, the O-ring 146 rests directly upon the workpiece 150, and the gas flow path, employing the apertures 142, is similar to that previously described in connection with window operation. In this type of use, the sleeve 46 is removed, or the counter body 68 is dropped sufficiently so that the O-ring 146 extends beyond the end of the sleeve, thus permitting the egress of gas.

It will readily be seen that many of the structural features of the illustrated embodiment of the invention may readily be adapted by those skilled in the art, either singly or in combination, to nuclear radiation counters far different in appearance and details of construction from the illustrated embodiment of the invention. Accordingly, in order that the patent protection afforded the invention shall be sufficient to dominate the utilization of the teachings of the invention in such other embodiments thereof, the scope of the invention should not be deemed to be limited by the particular embodiment shown, but shall be defined only by the appended claims.

What is claimed is:

1. A radiation counter comprising a first electrode forming a cavity substantially in the form of a toroid generated by rotation of a plane figure comprising a semicircle having appended thereto one-half of the circumscribed square, about a line intersecting the plane figure, and perpendicular to the diameter of the semi-circle and displaced from the center thereof, and a second electrode insulatingly supported within said cavity in the form of a circular loop lying on the circular path generated by the center of the semi-circular portion of the plane figure.

2. A radiation counter comprising a first electrode forming a cavity substantially in the form of a toroid generated by rotation of an at least partially circular plane figure about a line intersecting the circular portion of the plane figure, and displaced from the center thereof, and a second electrode insulatingly supported within said cavity in the form of a circular loop lying on the circular path generated by the center of the circular portion of the plane figure of generation.

3. The radiation counter of claim 2 wherein the figure of generation is a semi-circle having appended thereto one half of the circumscribed square, so that the second electrode is spaced from the flat portion of the first electrode by the same distance as from the round portion.

4. The radiation counter of claim 3 wherein the flat portion is a conducting radiation-transparent window.

5. A radiation counter comprising a round cavity electrode, a second electrode in the form of a substantially circular wire loop, means for insulatingly supporting the second electrode within and coaxial with the first electrode, and a tapered boss extending into the cavity electrode on the axis thereof and having circumferentially distributed gas inlet apertures directed at the second electrode.

6. A radiation counter comprising a cavity electrode, a second electrode in the form of a wire loop of a shape conforming to the cross-sectional shape of the cavity, means for insulatingly supporting the second electrode within and coaxial with the first electrode, and a tapered boss extending into the center of the cavity electrode and having circumferentially distributed gas inlet apertures directed at the second electrode.

7. Radiation counting apparatus comprising a radiation counter having therein a plurality of electrodes and having an opening adapted to be placed over a sample at one end, a gas inlet at the other end, and a resilient sealing member mounted on the open end and completely surrounding the opening, and a radioactive sample holder having its peripheral portion seated against the sealing member and having a central cup adapted to receive a radioactive sample and an aperture connecting the cup to the atmosphere, whereby the gas employed in the counter flows through the inter-electrode region of the counter and through the region immediately adjacent to a sample placed on the central cup to flush air from the region between the sample and the inter-electrode region of the counter, and the sample holder may be readily replaced by a similar sample holder.

8. Radiation counting apparatus comprising a radiation counter having therein a plurality of electrodes and having an opening adapted to be placed over a sample at one end, a gas inlet at the other end and a resilient sealing member mounted on the open end and completely surrounding the opening, and a radioactive sample holder having its peripheral portion seated against the sealing member and having apertures forming vents to the atmosphere from the central portion thereof, whereby the gas employed in the counter flows through the inter-electrode region of the counter and through the region immediately adjacent to a sample placed on the sample holder to flush air from the region between the sample and the inter-electrode region of the counter, and the sample holder may be readily replaced by a similar sample holder.

9. Radiation counting apparatus comprising a hollow support member open only at the lower end and having a lower edge adapted to form a gas-tight seal against a surface upon which it is placed, a thin-window flow-type radiation counter having a gas inlet connected to the ionization cavity thereof and a gas vent, and means for supporting the radiation counter within the support member, so that gas vented from the counter flows through the cavity formed by the support member and a surface on which it is placed to flush air from the region between a radioactive sample and the window of the counter.

10. Radiation counting apparatus comprising a thin-window flow-type radiation counter having a gas inlet connected to the ionization cavity thereof, means for forming an open-ended chamber adjacent to the outer surface of the window of the counter, and a gas vent connecting the interior of the counter to the chamber, so that gas flushed through the counter flows past a sample over which the open end of the chamber is placed, to flush air from the space between the sample and the window.

11. Radiation counting apparatus comprising a radiation counter cavity having therein electrodes adapted for the counting of nuclear radiations, a gas flow inlet in a wall of the cavity and an opening in another wall of the cavity, a first open mounting member having on the outer end thereof a resilient sealing member, a second open mounting member having thereacross a radiation-transparent window, and cooperating disengageable fastening means on both of the mounting members and on the opening in the cavity, whereby the counter is operable selectively as a windowless counter and as a thin-window counter by employment of the appropriate mounting member.

12. Radiation counting apparatus comprising a radiation counter having therein a plurality of electrodes and having an opening at the lower end and a resilient sealing member completely surrounding the opening, a radioactive sample holder, an apertured support member beneath the counter, an apertured weight seated around the aperture in the support member, the aperture in the weight being smaller than the sample holder and the aperture in the support member being larger than the sample holder, and means for moving the sample holder upward through the aperture in the support member to sealed engagement with the sealing member, whereby the weight is carried upward by the sample holder and disengages the sample holder from the sealing member upon withdrawal of the moving means.

References Cited in the file of this patent
UNITED STATES PATENTS

| | | |
|---|---|---|
| 2,449,872 | Brasch et al. | Sept. 21, 1948 |
| 2,505,919 | Simpson | May 2, 1950 |
| 2,551,531 | Freedman | May 1, 1951 |
| 2,617,953 | Brasch | Nov. 11, 1952 |
| 2,736,812 | Weinstein et al. | Feb. 28, 1956 |